Patented Oct. 10, 1939

2,175,803

UNITED STATES PATENT OFFICE 2,175,803

VAT DYESTUFFS OF THE ANTHRAQUINONE SERIES

Ernst Honold and Max Schubert, Frankfort-on-the-Main-Fechenheim, Germany, assignors to General Aniline Works, Inc., New York, N. Y., a corporation of Delaware No Drawing. Application May 24, 1938, Serial No. 209,726. In Germany May 29, 1937

4 Claims. (Cl. 260—157)

Our present invention relates to valuable vat dyestuffs of the antraquinone series, more particularly to those of the formula:

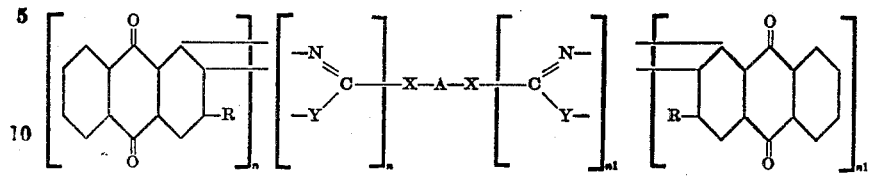

wherein R stands for a member of the group consisting of hydrogen and halogen, $n$ and $n_1$ stand for one of the numbers 1 and 2, Y for a member of the group consisting of —S— —O— and

—N—
 |

X for a member of the group consisting of the phenylene, halogenated phenylene, alkoxyphenylene, the naphthalene, the diphenylene radical, the radical of diphenyleneoxide, fluorene, carbazole and diphenylsulfide, and an ar-aliphatic radical (ar meaning the phenyl radical), A stands for a member of the group consisting of —N=N—,

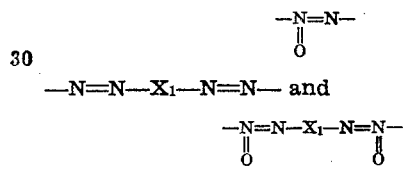

—N=N—X$_1$—N=N— and

—N=N—X$_1$—N=N—
 ‖        ‖
 O        O

X$_1$ meaning a member of the group consisting of the diphenylene, azobenzene and benzophenone radical, the pairs of X, Y, $n$ and $n_1$ having identical value.

The new vat dyestuffs are obtainable by condensing such amines of the anthraquinone series as contain in ortho-position to the amino group a further amino group or a hydroxy or mercapto group, which amines are able to form an imidazole or oxazole or thiazole ring during the condensation reaction, with carboxylic acids of the general formula:

(HOOC)$_n$—X—A—X—(COOH)$_{n1}$ wherein $n$, $n_1$, X, A and X have the above said signification, or their functional derivatives.

Advantageously the condensation reaction is performed in organic solvents. By acting with the carboxylic acid chlorides of the said azo or azoxy compounds on the amines condensation ocurs in some cases already at room temperature. The condensation reaction is finished at elevated temperatures whereby simultaneously the formation of the azole ring is performed.

The same new condensation products can be obtained by starting from such amines of vattable ring systems, as contain in o-position to the amine group another suitable substituent such as for example a halogen atom, which substituent can be replaced by (or converted to) an amino or hydroxy or mercapto group, after the condensation of the amine with the carboxylic acid has been performed. Hereafter the formation of the azole ring is carried out.

The present new dyestuffs are moreover partly obtainable by starting from compounds of the general formula:

wherein Y has the above signification and Z stands for a nitrogenous group of a lower or higher degree of oxidation than an azo- or azoxy-group. If Z stands for a group of a lower degree of oxidation, the present dyestuffs are obtainable by oxidation according to usual methods of such initial products, if Z stands for a group of a higher degree of oxidation, then reduction of such initial products yields the present new dyestuffs.

The present new dyestuffs thus obtained dye vegetable fibers from the vat yellowish shades and exhibit a good fastness to chlorine and boiling soap solution and in many cases to light. It is a surprising fact that the new dyestuffs are likewise vattable compounds and that the azo or azoxy groups contained in these compounds are not reduced in the vat with splitting of the molecule and formation of amines.

In order to further illustrate our invention the following examples are given, the parts being by weight and all temperatures in degrees centigrade.

*Example 1*

28 parts of the sodium salt of 2-amino-1-mercapto-antraquinone are finely divided in about 200 parts of nitrobenzene, then 16 parts of azobenzene-4.4'-dicarboxylic acid dichloride are added, while stirring, and the temperature of the mixture is slowly raised by heating so that the mixture begins to boil after about 2 hours. Then it is heated to boiling for some hours under a reflux condenser. The condensation product formed, which is slightly soluble, is filtered off, washed and purified, if necessary by after-treatment with dilute chlorine water containing sodium carbonate. The new dyestuff of the formula:

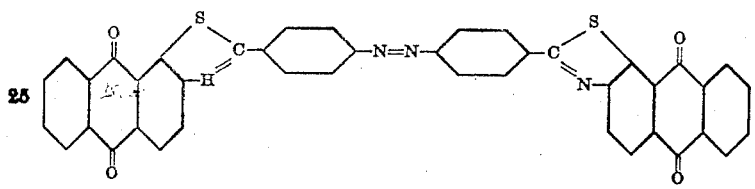

dissolves in concentrated sulfuric acid with red color and dyes cotton from a violetish red vat very fast yellow shades.

When using as one reaction component the 3.3'-dimethoxyazobenzene-4.4'-dicarboxylic acid dichloride or the azoxybenzene-4.4'-dicarboxylic acid dichloride very similar vat dyestuffs are obtained.

*Example 2*

To a suspension of 28 parts of the sodium salt of 2-amino-1-mercaptoanthraquinone in about 300 parts of nitrobenzene 16 parts of azobenzene-3.3'-dicarboxylic acid dichloride are added. The mixture is stirred at room temperature for about 3 hours and then boiled for about 8 hours in an apparatus provided with a reflux condenser. While hot the condensation product thus formed is isolated and may be purified by treatment with a hypochlorite solution. The new dyestuff of the formula:

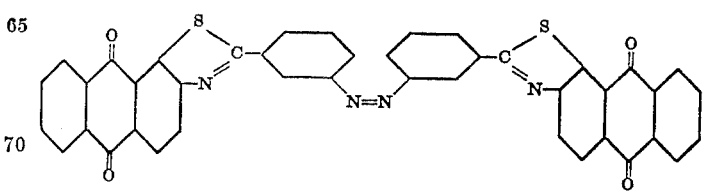

dissolves in concentrated sulfuric acid with a slightly yellowish brown color and dyes cotton from a violetish red vat strong greenish yellow shades of good fastness properties.

A very similar dyestuff is obtained when using as one reaction component the 4.4'-dichloroazobenzene-3.3'-dicarboxylic acid dichloride.

*Example 3*

To a suspension of 25 parts of 3'-aminophenyl-1-(S)-2(N)-thiazolanthraquinone of the formula:

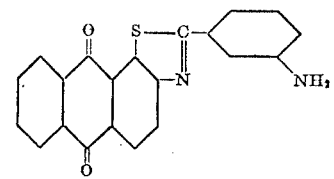

in about 500 parts of water a mixture of 100 parts of an aqueous sodium carbonate solution of 10% strength and of about 500 parts of a sodium hypochlorite solution containing about 12 to 15% of active chlorine is added. Then the mixture is held, while stirring, at 95 to 100° until the coloration has turned to yellow orange and unchanged amine can no more be detected. The formed reaction product is filtered off, washed out and dried. It is identical to the condensation product of Example 2, paragraph 1.

*Example 4*

According to the process as described in Example 2, 28 parts of the sodium salt of 2-amino-1-mercaptoanthraquinone are condensed with 23 parts of diphenylazodiphenyl-4.4'-dicarboxylic acid dichloride in the presence of nitrobenzene. The formed dyestuff of the formula:

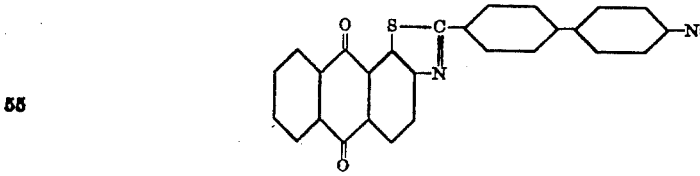

dissolves in concentrated sulfuric acid with a violetish red color and dyes cotton from a violetish red vat very fast yellow shades.

When condensing according to the same process the sodium salt of 2-amino-1-mercaptoanthraquinone with azobenzene-4,3',5'-tricarboxylic acid trichloride there is formed a condensation product of the formula:

the fluorene, carbazole and diphenylsulfide series, while forming the corresponding condensation products.

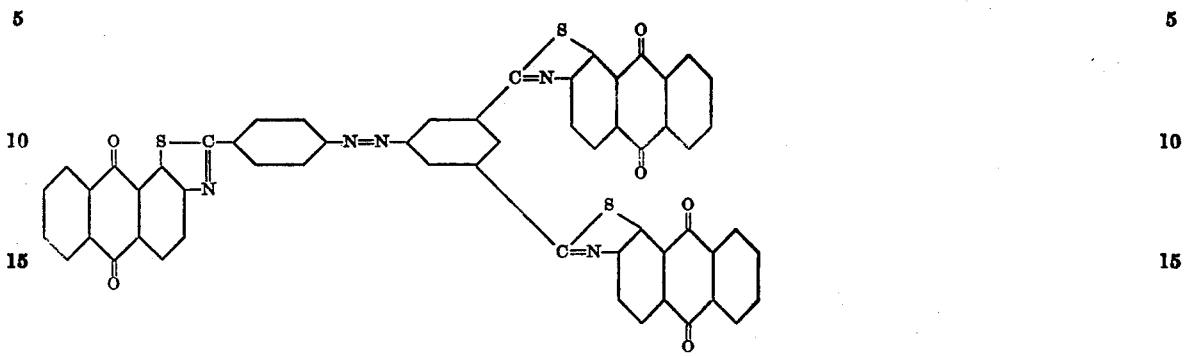

When using as second reaction component azobenzene-3,5,3',5'-tetracarboxylic acid tetrachloride the condensation product corresponds with the forumla:

When condensing in the same manner the sodium salt of 2-amino-1-mercaptoanthraquinone with 1.1'-azonaphthalene-5.5'-dicarboxylic acid dichloride the condensation product corresponds with the formula:

When using diphenyleneoxide-azo-diphenyleneoxide-2.2'-dicarboxylic acid dichloride the condensation product corresponds with the formula:

When using as second reaction components 3.3'-azocinnamic acid dichloride, 4.4'-azophenoxyacetic acid dichloride and 4.4'-azophenylacetic acid dichloride the formed condensation products In the same manner, one may condense the corresponding dicarboxylic acid dichlorides of correspond with the following formulae respectively:

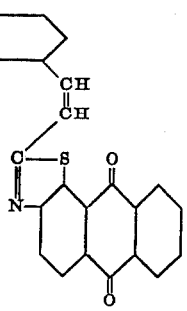
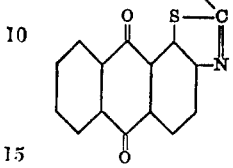

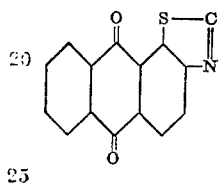 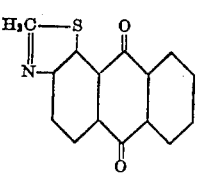

and

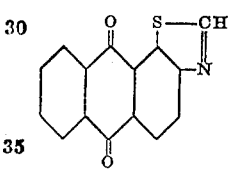 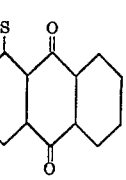

When using as second reaction component the dichloride of the formula:

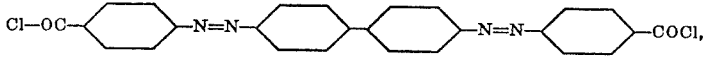

obtainable by condensing one molecular proportion of benzidine with two molecular proportions of the methylester of 4-nitrosobenzoic acid, saponifying the formed condensation product and treating it with phosphorus pentachloride, the formed condensation product corresponds with the formula:

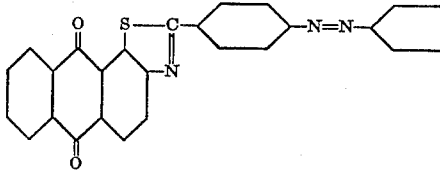 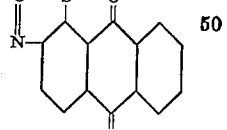

obtainable by condensing one molecular proportion of 4.4'-diaminoazobenzene with two molecular proportions of the methylester of 4-nitrosobenzoic acid, saponifying the condensation product formed and treating it with phosphorus pentachloride the formed condensation product corresponds with the formula:

When condensing in the same manner one molecular proportion of 4.4'-diaminobenzophenone and of 4.4'4''-triaminotriphenylmethane with two and three molecular proportions respectively of the methylester of 4-nitrosobenzoic acid, saponifying the formed condensation products When using as second reaction component the dichloride of the formula:

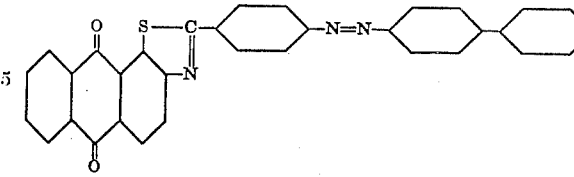 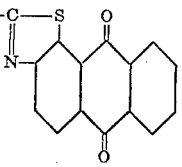

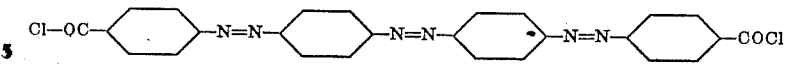

and treating them with phosphorus pentachloride and finally condensing the chlorides thus formed with the sodium salt of 2-amino-1-mercaptoanthraquinone the formed condensation products correspond with the formulae:

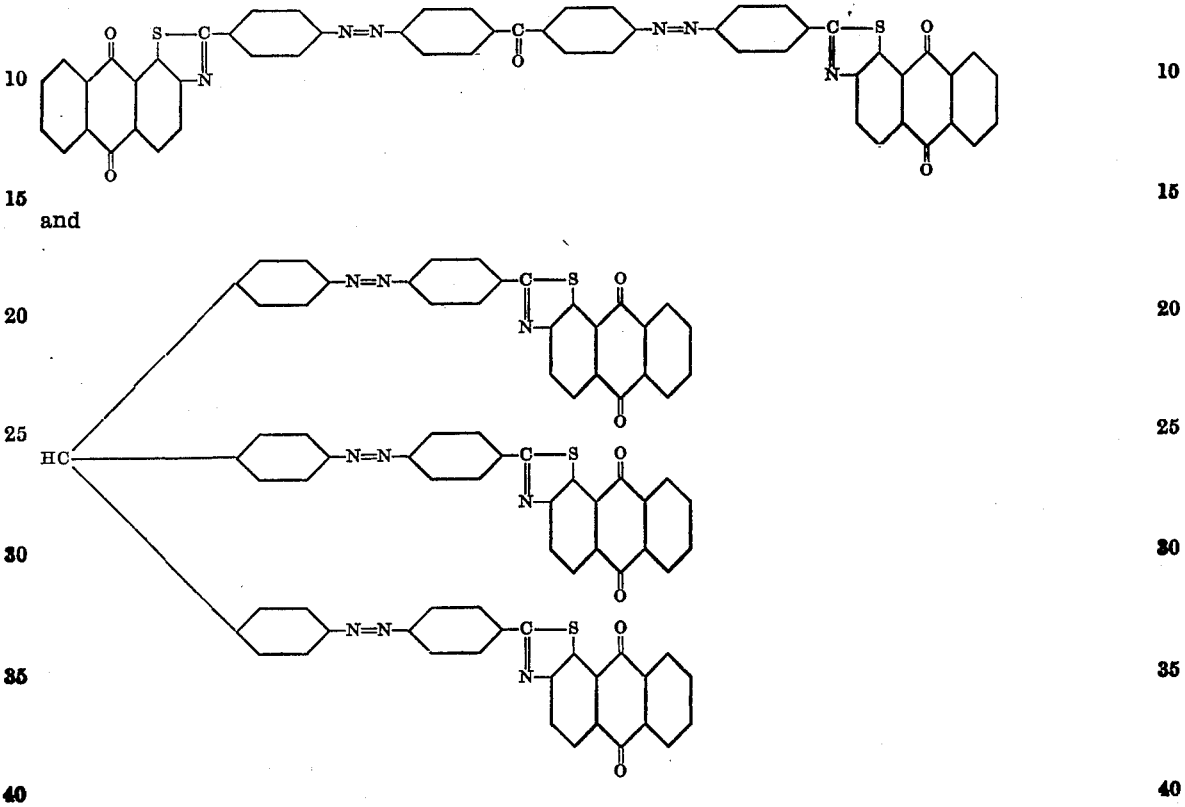

and respectively.

All of these condensation products dissolve in concentrated sulfuric acid with a yellowish-brown to dark red color and dye from a brown to a violet vat the vegetable fibers fast yellow shades.

*Example 5*

To a solution held at about 160° of 24 parts of 1-amino-2-hydroxyanthraquinone in about 300 parts of nitrobenzene, 16 parts of azobenzene-4.4'-dicarboxylic acid dichloride are added and the mixture is boiled for about 8 hours in an apparatus provided with a reflux condenser. The condensation product, which separates almost completely in the heat, is isolated. The new dyestuff of the formula:

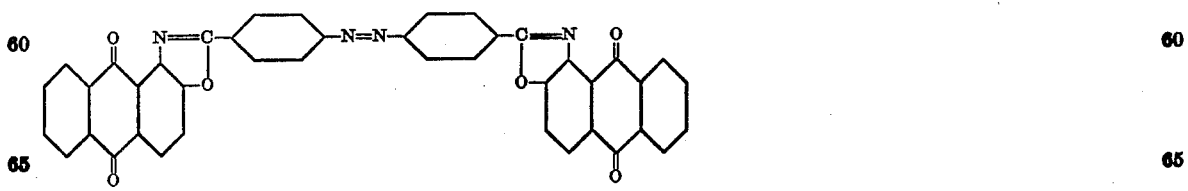

dissolves in concentrated sulfuric acid with a orange red color and dyes cotton from a dark red vat fast somewhat greenish yellow shades. The dyestuff is very fast to chlorine and may be purified, if necessary, by treatment with a chlorinating agent.

When using diphenyl-azodiphenyl-4.4'-dicarboxylic acid dichloride as second reaction component, the formed dyestuff dyes cotton fast yellow shades of a somewhat more greenish tint.

A very similar dyestuff is obtained when using as one reaction component the diphenyl-azoxy-diphenyl-4.4'-dicarboxylic acid dichloride.

*Example 6*

To a suspension of 23 parts of 4'-aminophenyl-2,1-(N)-oxazoloanthraquinone of the formula:

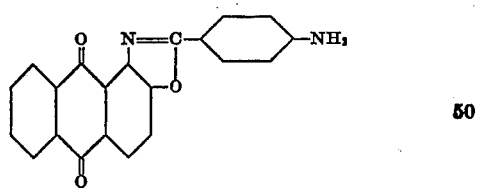

in about 500 parts of water, 100 parts of an aqueous sodium carbonate solution of 10% strength and about 500 parts of a sodium hypochlorite solution containing 12 to 15% of active chlorine are added. Then the mixture is stirred at 95 to 100° until the color has turned to yellowish orange and no more unchanged amine can be detected. The formed reaction product is isolated and dried. It is identical with the dyestuff as described in paragraph 1 of the foregoing example.

Example 7

To a solution of 34 parts of 1-methylamino-2-amino-3-brom-anthraquinone in about 300 parts of trichlorobenzene, while stirring, at about 160°, 16 parts of azobenzene-4.4'-dicarboxylic acid dichloride are added and the mixture is boiled for about 8 hours in an apparatus provided with a reflux condenser. The condensation product which separates in the heat is filtered off, washed out and dried. The new dyestuff of the formula:

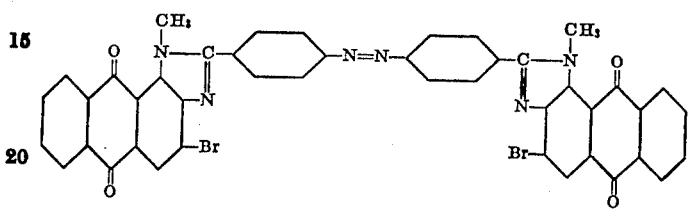

dissolves in concentrated sulfuric acid with a yellow color and dyes cotton from a red vat fast yellow shades.

A very similar dyestuff is obtained when using as second reaction component azobenzene-3.3'-dicarboxylic acid dichloride.

Example 8

14 parts of the sodium salt of 1-amino-2-mercaptoanthraquinone are condensed with 8 parts of azobenzene-4.4'-dicarboxylic acid dichloride by heating for some hours with the addition of nitrobenzene at about 220°. The condensation product of the formula:

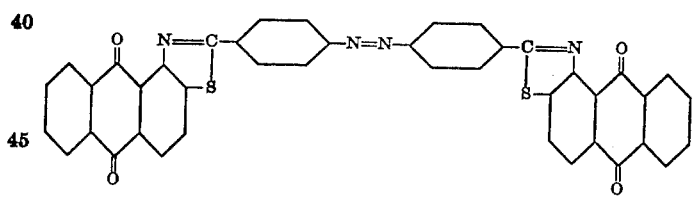

is isolated. It dissolves in concentrated sulfuric acid with an orange-red color and dyes cotton from a dark red vat fast greenish yellow shades.

We claim:

1. Vat dyestuffs of the anthraquinone series corresponding to the formula:

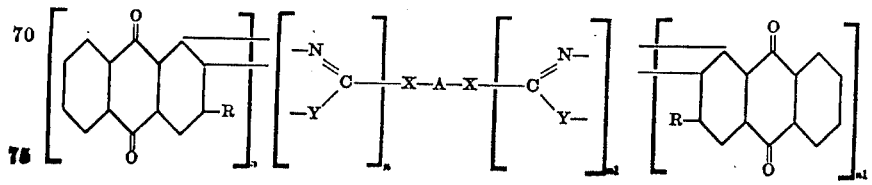

wherein R stands for a member of the group consisting of hydrogen and halogen, $n$ and $n_1$ stand for one of the numbers 1 and 2, Y for a member of the group consisting of —S—, —O— and $$-\overset{|}{N}-$$

X for a member of the group consisting of the phenylene, halogenated phenylene, alkoxyphenylene, the naphthalene, the diphenylene radical, the radical of diphenyleneoxide, fluorene, carbazole and diphenylsulfide, and an ar-aliphatic radical (ar meaning the phenyl radical), A stands for a member of the group consisting of —N=N—, $$-\overset{\text{O}}{\overset{\|}{N}}=N-$$

—N=N—X₁—N=N— and $$-N=N-X_1-N=N-\\ \overset{\|}{O}\quad\quad\overset{\|}{O}$$

X₁ meaning a member of the group consisting of the diphenylene, azobenzene and benzophenone radical, the pairs of X, Y, $n$ and $n_1$ having identical value, which dyestuffs dye vegetable fibers from the vat yellowish shades and exhibit a good fastness to chlorine and boiling soap solutions.

2. A vat dyestuff of the anthraquinone series of the formula:

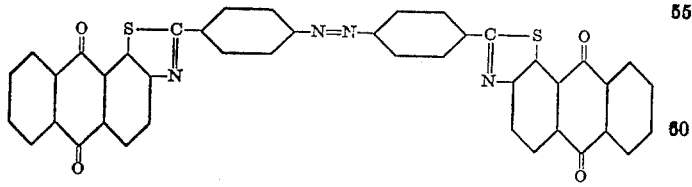

which dyestuff dissolves in concentrated sulfuric acid with a red color and dyes cotton from a violetish red vat very fast yellow shades.

3. A vat dyestuff of the anthraquinone series of the formula:

![structure]

which dyestuff dissolves in concentrated sulfuric acid with a violetish red color and dyes cotton from a violetish red vat very fast yellow shades.

4. A vat dyestuff of the anthraquinone series of the formula:

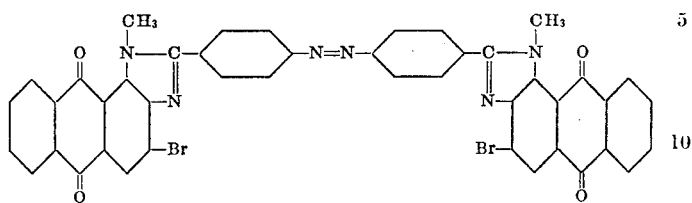

which dyestuff dissolves in concentrated sulfuric acid with a brown color and dyes cotton from a reddish brown vat fast yellow shades.

ERNST HONOLD.
MAX SCHUBERT.